Jan. 21, 1964 R. W. WESTEEN ET AL 3,118,959
PREPARATION OF SHAPED PROTEIN PRODUCTS
Filed Feb. 6, 1963
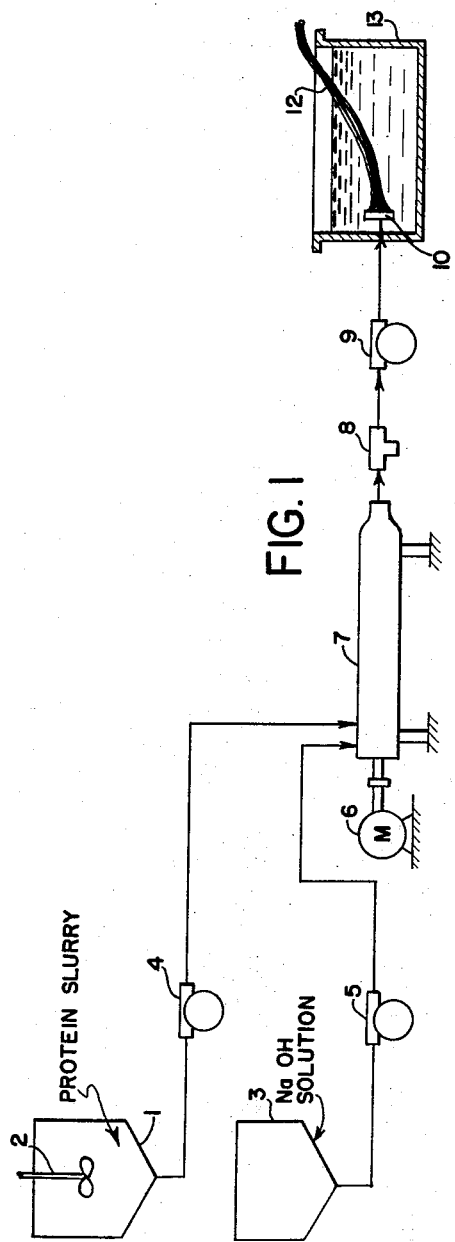
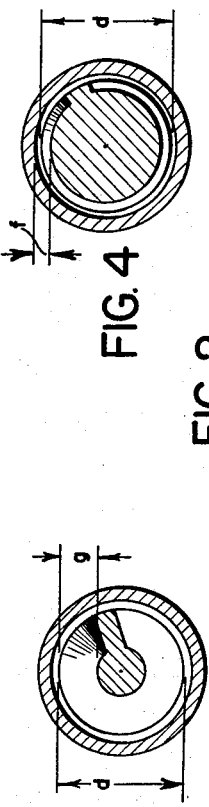
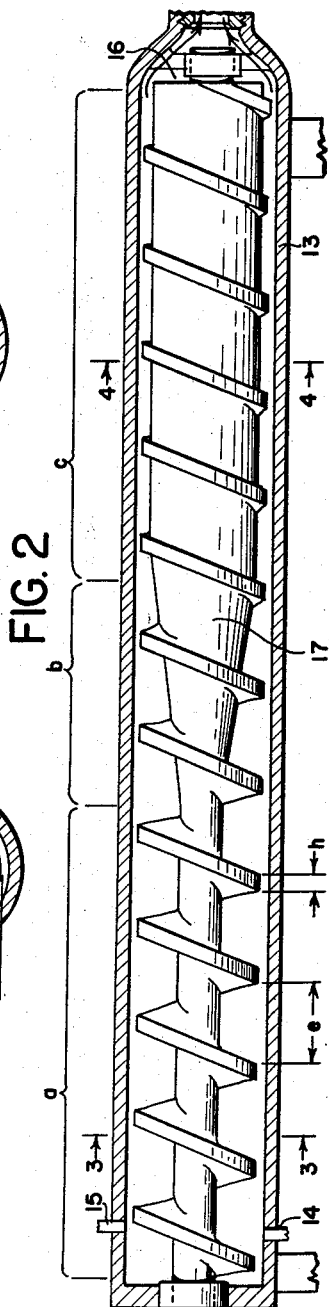
INVENTORS
RICHARD W. WESTEEN
SIMPEY KURAMOTO
BY
*Gene A. Enochson*
AGENT

United States Patent Office 3,118,959
Patented Jan. 21, 1964

3,118,959
PREPARATION OF SHAPED PROTEIN PRODUCTS
Richard W. Westeen and Simpey Kuramoto, Minneapolis, Minn., assignors to General Mills, Inc., a corporation of Delaware
Filed Feb. 6, 1963, Ser. No. 256,672
9 Claims. (Cl. 264—202)

The present invention relates to a process for preparing shaped protein products. More particularly, it relates to a continuous process for producing fibers from proteins.

Much interest has recently been expressed in the production of meat substitutes from edible protein materials, such as soybean, corn or peanut proteins, as well as from animal proteins, such as casein. The first step in the production of such simulated meats is the preparation of fibers or filaments from the protein materials. Groups of these filaments are impregnated with suitable binders, flavoring agents and the like to produce the simulated meats.

The available processes for preparing the fibers or filaments have not been entirely satisfactory. Thus, conventionally, spinning solutions have been prepared by dissolving a separated protein in aquous alkali and then maturing the solution at a highly alkaline pH. This batch preparation of the spinning solution has several disadvantages. The primary disadvantage is the production of fibers or filaments which are not uniform. Thus some of the fibers produced have very bad off-odors and flavors. This appears to be due to changes and degradation of the protein material itself. Extreme conditions, notably temperature and high pH, accelerate the rate and possibly the ultimate degree of change. When caustic is added to a protein slurry in an amount sufficient to yield a solution suitable for spinning (i.e. pH of 10.5 or higher), the viscosity of the mixture increases rapidly. Depending on conditions (i.e. rate of mixing, caustic level, temperature and solids content), the maximum viscosity is attained in a few minutes. The viscosity then drops and this drop in viscosity measures the degradation of the protein due to the extreme pH conditions. In the preparation of fibers from a batch of spinning solution, the first fibers will be fairly acceptable but those prepared from the last portions of the solution often have an off odor and/or flavor due to the degradation of the protein material under the high pH conditions. This lack of uniformity in the fibers is particularly acute when large batches of spinning solution are prepared.

In addition to the lack of uniformity of the fibers, the batch preparation technique often results in a loss of a substantial portion of the spinning solution. This is due to the degradation of the protein material and the accompanying change of viscosity of the spinning solution. In this respect, the whole spinning solution may have to be discarded, for example, where mechanical failure prevents the use thereof within the prescribed time period after preparation. It is also difficult, if not impossible, to achieve continuous filament production when the spinning solution or dope is prepared batchwise. This would require the preparation of several spinning solutions at predetermined time intervals in separate vessels with the use of such solutions alternately as the feed solution or dope. A considerable amount of expense would be involved in supplying the needed equipment. Also, such a process would require critical control of the viscosity of each of the spinning solutions and mechanical failure could result in a substantial loss of solution. It would still be very difficult, if not impossible, to prepare fibers having uniform properties suitable for the production of simulated meats.

It has recently been proposed to produce protein filaments by first preparing a stock solution of protein and alkali and then continuously feeding additional alkali into a stream of the stock solution to raise the pH thereof to about 11.5 to 13.5. Filaments are produced by extruding the resulting stream of aged protein through an extrusion device immersed in an acid coagulating bath. This process has the advantage of giving better control over the viscosity of the spinning solution. However, it requires the preparation of a stock solution having a pH in the range of 10.0 to 10.5. Thus a slurry of protein is first blended with a sufficient amount of alkali and water to produce a stock solution having the designated pH and the required solids content. The protein in this stock solution has a tendency to degrade, especially when the stock solution is stored for any length of time. Also when used, such stock solution must be mixed with additional alkali and water to prepare the spinning solution. A substantial amount of equipment is still required. Thus, vessels or supply sources are required for the original protein slurry, alkali solution and water as well as for the stock solution, additional alkali solution and water. Mixing devices are required in the preparation of both the stock solution and the spinning solution. Three separate metering devices are needed to control the relative amounts of the protein slurry, alkali and water used in preparing the stock solution and to control the relative amounts of the stock solution, alkali and water used in preparing the spinning solution. It would be highly desirable to provide a process for the continuous production of protein fibers wherein the fibers would have a high degree of uniformity and the step of preparing a stock solution of increased pH could be eliminated with attendant savings in time and equipment.

It is, therefore, an object of the present invention to provide a novel process for the preparation of shaped protein products.

Another object of the invention is to provide a continuous process for the preparation of shaped protein products, particularly filaments, from an aqueous protein slurry having a pH of less than about 7.0.

These and other objects of the present invention will become apparent from the following detailed description.

We have now discovered that shaped protein products can be prepared by continuously: (1) charging an aqueous protein slurry having a pH of less than about 7.0 and an aqueous solution of an alkaline material into a mixing device to yield an admixture having an initial pH of at least about 10.5; (2) intimately blending the aqueous protein slurry and the aqueous solution of the alkaline material while said slurry and said solution are being advanced to the discharge orifice of the mixing device; (3) discharging the resulting spinning solution from the discharge orifice of the mixing device; and (4) extruding the stream of spinning solution through an extrusion device immersed in an acid coagulating bath to form the shaped protein product.

In the drawings,

FIGURE 1 is a diagrammatic representation of one embodiment of the process of the invention;

FIGURE 2 is a side elevational view in section of screw pump 7 of FIGURE 1;

FIGURE 3 is a sectional view of the embodiment of FIGURE 2 taken generally along and in the direction of arrows 3, 3 of FIGURE 2; and FIGURE 4 is a sectional view of the embodiment of FIGURE 2 taken generally along and in the direction of arrows 4, 4 of FIGURE 2.

A wide variety of protein materials which are edible can be used in preparing the shaped protein products according to the present invention. Representative of such materials are soybean, safflower, corn, peanut and pea proteins as well as various animal proteins such as casein and keratin. Generally, the proteins are used in relatively pure form. Thus, for example, soybeans may be dehulled and solvent extracted, preferably with hexane, to remove the oil therefrom. The resulting substantially oil-free soybean flakes or meal are then suspended in water and sufficient alkali or other alkaline substance added to dissolve the protein while leaving undissolved carbohydrates and certain other materials in the meal. After separation of the extract, the protein is precipitated from it by the addition of an acidic substance, such as acetic acid, sulfur dioxide and the like. The precipitate is then conventionally collected by filtration or centrifugation, water washed and dried. This dried protein isolate can be used to prepare the aqueous protein slurry which serves as the starting material for preparing spinning solutions according to our process. As an unexpected feature of our invention, we have discovered that the separated protein need not be dried prior to use thereof in our spinning process. Thus, the precipitate after separation and water washing, if desired, can be diluted with water to provide the aqueous protein slurry. This eliminates the costly drying step and any denaturization of the protein during such drying operation. It also makes it possible to provide a continuous process for preparing shaped protein products starting with the substantially oil-free oilseed flakes. Thus, the flakes can be extracted with aqueous alkali, the extract separated from the flakes, the protein precipitated from the extract, the precipitated protein collected and diluted with water to provide the slurry, the slurry used to prepare the spinning dope or solution and the solution extruded to provide the shaped protein products in one continuous operation. Especially good results are obtained when the acidifying substance is sulfur dioxide since the resulting precipitate provides an aqueous protein slurry of improved properties, i.e. more homogeneous.

The solids content of the aqueous protein slurry will vary considerably dependent upon the particular protein used. Generally, the solids content will be in the range of about 10 to 35% by weight. Preferably, the solids content of soybean protein in the slurry will be from about 15% to 30% by weight.

The alkaline substance is preferably sodium hydroxide, although any alkaline substance compatible with the use to which the solution and extruded products are to be put and capable of raising the pH of the solution to the required extent may be used. Dilute aqueous solutions containing about 10 to 20% by weight of the alkaline substance are preferred.

As indicated, the protein slurry and alkaline solution are charged in predetermined amounts into a mixing device. The slurry and alkaline solution are intimately blended in the mixing section of the device and continuously advanced toward the discharge orifice of the device. The spinning solution is then forced out of the discharge orifice of the mixing device at which point it could be extruded into the acid coagulating bath to form the shaped protein product. Preferably, however, the stream of solution is passed through a metering pump and then to the extrusion device. Also, the solution may be filtered prior to extrusion and the pH and solids content can be optionally measured by devices designed for that purpose inserted into the line carrying the spinning solution or dope to the extrusion device. The extrusion device preferably contains a spinneret, which is actually a small die having from perhaps 1,000 to 16,000 holes each on the order of 0.002–0.006 inch in diameter. The resulting filaments will be of a diameter of about 0.002–0.006 inch. The spinning solution may, of course, be extruded to form finer or coarser filaments as desired for the particular use to which such shaped protein products are to be put.

The mixing device contains means for intimately blending the aqueous protein slurry and the aqueous alkaline solution and for uniformly advancing the slurry and solution to the discharge orifice of the device. One particularly suitable mixing device is a screw pump having mixing and metering sections. As the protein slurry and alkaline solution are intimately blended in the mixing section, the viscosity increases and the resulting blend is advanced toward the discharge orifice or end of the screw pump. A positive pressure is developed in the metering section of the pump. The screw pump provides very uniform mixing and, in addition, assures a first in, first out action—i.e. no pockets of high viscosity material are bypassed or left to age in the mixing device.

The coagulating bath is preferably an aqueous solution of salt and an acid. The salt (i.e. NaCl, for example) can be used in widely varying concentrations such as from about 0.5 to 16% by weight. The acid can be any of those normally used in the coagulating bath. Representative acidic compounds are acetic acid, lactic acid, citric acid, adipic acid, hydrochloric acid and the like. Sulfur dioxide or sulfur dioxide producing materials may also be used in the coagulating bath to yield fibers of good color and flavor. The concentration of said acid in the bath is not critical and may vary between about 0.5 to 10% by weight.

When the shaped protein products are to be used in the preparation of simulated meat products, for example, the filaments or bundles thereof (tows) are pulled from the coagulating bath, treated with an alkaline substance to raise the pH thereof to about 4.0 to about 7.0 and then impregnated with binders, flavoring agents and the like. The impregnated fibers can then be set-up, cut into various size pieces, smoked and/or dehydrated. It is also understood that a series of spinnerets can be connected to the discharge orifice of the mixing device to produce several tows of filaments from the spinning solution. Such spinnerets may have the same or different number of holes making it possible to directly produce tows of filaments having the same or different diameters. These tows can be combined to produce the ultimate simulated meats if desired.

The process of the present invention is preferably carried out at ambient room temperatures. However, higher or lower temperatures can be used. Temperatures much above about 25° C. would reduce the process time somewhat but would require additional equipment—i.e. heating means for the mixing device. The processing time according to our process is unexpectedly short even at ambient room temperatures. Thus, from the initial contact of the protein slurry and alkaline solution in the inlet portion of the mixing device to the extrusion of the resulting spinning solution from the extrusion device, only about 1 to about 15 minutes elapse. Obviously, this retention time will vary somewhat with the particular protein used, the pH of the resulting spinning solution, the temperature and the like. Preferably, the spinning solution will be extruded just prior to reaching the peak viscosity thereof.

With reference to the drawings, the protein slurry in make-up vessel 1 equipped with stirrer 2 is fed by a metering pump 4 to the inlet end of a screw pump 7. The aqueous sodium hydroxide solution in make-up vessel 3 is fed by a metering pump 5 to the inlet end of the screw pump. The amounts of the protein slurry and alkali solution are regulated by metering pumps 4 and 5 to produce an admixture in the screw pump having an initial pH of at least about 10.5. The solids content of the slurry can be further regulated by providing a source of water which can be metered into the slurry prior to passage through metering pump 4 or can be metered into the inlet portion of the screw pump. The screw pump is driven by power means 6. The amount of rotation will vary considerably but will generally be within the range of about 35 to 1000 r.p.m. The spinning solution is discharged from the discharge end of the screw pump into a line connected to metering pump 9 and also preferably through a line filter 8. The filter removes any fine nonprotein or other foreign particles. The spinning solution is then pumped to the extrusion device containing a spinneret 10 immersed in an acid coagulating bath 11 to form a tow of fibers 12.

The preferred mixing device, the screw pump 7, comprises a cylindrical housing 13, a helix 17 having a mixing section a of channel depth f, a transition section b of decreasing channel depth and a metering section c of channel depth g, inlets 14 and 15 for introduction of the protein slurry and alkali solutions and a discharge orifice 16. The dimensions of the various sections of the helix, based on the diameter D thereof are preferably as follows:

| | |
|---|---|
| Length mixing section a | 4–12 x D. |
| Length metering section c | 4–12 x D. |
| Length transition section b | ½–6 x D. |
| Channel depth f of mixing section | $\frac{1}{3}$–$\frac{1}{6}$ x D. |
| Channel depth g of metering section | $\frac{1}{10}$–$\frac{1}{20}$ x D. |
| Pitch e | ¼–1 x D. |
| Width h flat edge of helix | $\frac{1}{6}$–$\frac{1}{15}$ x D. |

The channel depth of the mixing and metering sections is preferably uniform while the channel depth of the transition section increases from that of the mixing section to that of the metering section, the increase being relatively uniform over the length of the transition section. The ratio of the lengths of the mixing and metering sections is generally in the range of 0.3:3.0 to 3.0 to 0.3, respectively. The clearance between the cylindrical housing and the flat edge of the helix should generally be less than about $\frac{1}{150}$ of the diameter D of the helix. The pitch e can be constant or variable, decreasing from the mixing section to the metering section. The diameter D of the helix can vary considerably but is preferably within the range of about 1 to 4 inches.

The following example serves to illustrate the present invention without limiting the same thereto.

*Example*

Three hundred pounds of hexane extracted soybean flakes were charged into a solution of 1.5 lb. $Na_2S_2O_4$ in 3000 lb. water at 40° C. The pH of the resulting slurry was adjusted to about 8.0 by the addition of 15.2 lbs. of a 10% by weight aqueous NaOH solution. After 35 minutes of agitation, the slurry was centrifuged to separate the extract from the spent flakes and then recentrifuged to remove traces of insolubles. The pH of the centrate was adjusted to 4.5 with sulfur dioxide and the precipitated protein concentrated by centrifugation. Traces of solubles were removed by reslurrying the protein in 5 volumes of water followed by reconcentration. The solids content of the slurry was adjusted to 17% by weight.

The slurry was charged into a make-up vessel equipped with a stirrer. This slurry was pumped into the inlet end of a screw pump at a rate of 254 g./min. A 10% by weight NaOH aqueous solution was pumped from a make-up vessel into the inlet end of a screw pump at a rate of 33 g./min. to yield an initial mixture in the pump having a solids content of 15% by weight protein. The screw pump had the following dimensions:

| | Inches |
|---|---|
| Overall length | 24 |
| Length mixing section | 6 |
| Length metering section | 12 |
| Length transition section | 6 |
| Channel depth of mixing section | 0.5 |
| Channel depth of metering section | 0.1 |
| Diameter of helix | 1.50 |
| Pitch | 0.75 |
| Width flat edge of helix | 0.10 |
| Clearance helix to housing | 0.07 |

The screw was rotated at 210 r.p.m.'s There was developed a pressure of 25 p.s.i. at the discharge end of the screw pump. The spinning solution was discharged into a line containing a filter and a metering pump. It was pumped to the extrusion device containing a spinneret having 15,000 holes (diameter of 0.003 in.) immersed in an acid coagulating bath (12% by weight NaCl and about 1.8% by weight acetic acid). The average time between the first contact of the protein slurry and alkali solution and the extrusion of the resulting spinning dope through the spinneret was about 5 minutes. There was obtained a continuous tow of protein filaments having excellent texture, color and odor. The fibers also had the desired strength for use in the production of simulated meats. After continuing the spinning for 4 hours, the fibers still had the same outstanding properties.

It is to be understood that the invention is not to be limited to the exact details of operation or the compositions, methods and apparatus shown and described, as obvious modifications will be apparent to those skilled in the art and the invention is to be limited only by the scope of the appended claims.

The embodiments of the invention in which an exclusive property or privilege is claimed are defined as follows:

1. A process for preparing shaped protein products comprising continuously: (1) charging an aqueous protein slurry having a solids content of about 10 to 35% by weight and a pH of less than about 7.0 and an aqueous solution of an alkaline material into a mixing device to yield an admixture having an initial pH of at least about 10.5; (2) intimately blending the aqueous protein slurry and the aqueous solution of the alkaline material while said slurry and said solution are being advanced to the discharge orifice of the mixing device; (3) discharging the resulting spinning solution from the discharge orifice of the mixing device; and (4) extruding the stream of spinning solution through an extrusion device immersed in an acid coagulating bath to form the shaped protein product.

2. The process of claim 1 wherein the protein is soy protein.

3. The process of claim 1 wherein the aqueous protein slurry is prepared by extracting substantially oil-free oilseed flakes with an aqueous alkaline solution, separating the extract from the flakes, precipitating the protein from the extract by the addition of acidic material, collecting the precipitated protein and adjusting the solids content of the separated protein by the addition of water to provide the slurry.

4. The process of claim 3 wherein the oilseed flakes are soybean flakes and the acidic material is sulfur dioxide.

5. The process of claim 1 wherein the alkaline material is sodium hydroxide.

6. The process of claim 1 wherein the extrusion device contains a spinneret.

7. The process of claim 1 wherein the time period between the charging (1) of the aqueous protein slurry and the aqueous solution of alkaline material into the mixing device and the extruding (3) of the resulting spinning solution is about 1 to about 15 minutes.

8. The process of claim 1 wherein the shaped protein product is (4) recovered from the acid coagulating bath.

9. The process of claim 1 wherein the mixing device is a screw pump having mixing and metering sections.

References Cited in the file of this patent

UNITED STATES PATENTS

| 2,809,090 | East et al. | Oct. 8, 1957 |
| 2,992,882 | Besso et al. | July 18, 1961 |

UNITED STATES PATENT OFFICE
CERTIFICATE OF CORRECTION

Patent No. 3,118,959                                    January 21, 1964

Richard W. Westeen et al.

It is hereby certified that error appears in the above numbered patent requiring correction and that the said Letters Patent should read as corrected below.

Column 6, line 61, for "(3)" read -- (4) --; line 64, for "(4)" read -- (5) --.

Signed and sealed this 16th day of June 1964.

(SEAL)
Attest:

ERNEST W. SWIDER
Attesting Officer

EDWARD J. BRENNER
Commissioner of Patents